(12) United States Patent
Dangeville et al.

(10) Patent No.: US 8,291,372 B2
(45) Date of Patent: Oct. 16, 2012

(54) CREATING GRAPHICAL MODELS REPRESENTING CONTROL FLOW OF A PROGRAM MANIPULATING DATA RESOURCES

(75) Inventors: Nicolas Dangeville, Paris (FR); Johan Ponin, Coubron (FR)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 12/397,564

(22) Filed: Mar. 4, 2009

(65) Prior Publication Data
US 2009/0241088 A1    Sep. 24, 2009

(30) Foreign Application Priority Data
Mar. 21, 2008 (EP) ..................... 08305064

(51) Int. Cl.
*G06F 9/44* (2006.01)
(52) U.S. Cl. .................. 717/104; 717/103; 717/105
(58) Field of Classification Search .............. 717/105, 717/106, 104
See application file for complete search history.

(56) References Cited

U.S. PATENT DOCUMENTS

| | | | | |
|---|---|---|---|---|
| 6,018,627 A * | 1/2000 | Iyengar et al. | ................. | 717/103 |
| 6,349,404 B1 * | 2/2002 | Moore et al. | ................. | 717/104 |
| 6,550,054 B1 * | 4/2003 | Stefaniak | ................. | 717/104 |
| 6,931,623 B2 * | 8/2005 | Vermeire et al. | .............. | 717/108 |
| 6,968,535 B2 * | 11/2005 | Stelting et al. | ................. | 717/104 |
| 7,620,958 B2 * | 11/2009 | Carrell et al. | ................. | 719/319 |
| 7,684,902 B2 * | 3/2010 | Igoe | ................. | 700/295 |
| 7,992,134 B2 * | 8/2011 | Hinchey et al. | ................. | 717/126 |
| 8,005,788 B2 * | 8/2011 | Leroux et al. | ................. | 707/624 |
| 8,082,538 B2 * | 12/2011 | Hinchey et al. | ................ | 717/104 |
| 8,086,994 B2 * | 12/2011 | O'Connell et al. | ........... | 717/104 |

OTHER PUBLICATIONS

Sarstedt, S., "Model-Driven Development with ActiveCharts—Tutorial," [online] University of Ulm, Technical Report No. 2006-01, Mar. 2006, [retrieved Mar. 4, 2009] retrieved from the Internet: <http://www.stefansarstedt.com/Publications/13250.218,UIB_2006-01.pdf>.

* cited by examiner

*Primary Examiner* — Isaac Tecklu
*Assistant Examiner* — Mohammad Kabir
(74) *Attorney, Agent, or Firm* — Patents on Demand P.A.; Brian K. Buchheit; Scott M. Garrett

(57) ABSTRACT

A class diagram can be created for an application. The application can use a modeling language. The application can be configured for creation of the class diagram. The class diagram can comprise classes and relationships. The application can also be configured for creating flow diagrams comprising actions, relationships, and definitions of model element types. The application can also be configured to create new model elements in the class diagram and flow diagrams. A program new model element type can be applied to relevant class operations in the class diagram and a resource new model element type to relevant data classes of the class diagram. A flow diagram can be created per program of the application. The flow diagrams can be applied as many new model element types as different types of actions exist in the flow diagrams. These actions can represent the operations on resources.

18 Claims, 5 Drawing Sheets

CREATING GRAPHICAL MODELS REPRESENTING CONTROL FLOW OF A PROGRAM MANIPULATING DATA RESOURCES

CROSS-REFERENCE TO RELATED APPLICATIONS

This application claims the benefit of European Patent Application No. 08305064.1 filed 21 Mar. 2008, entitled "A METHOD AND SYSTEM TO CREATE GRAPHICAL MODELS REPRESENTING CONTROL FLOW OF A PROGRAM MANIPULATING DATA RESOURCES", which is assigned to the assignee of the present application, and the teachings of which are hereby incorporated by reference in their entirety.

BACKGROUND

The present invention generally relates to software development and, more particularly, to representing a control flow of a program manipulating data resources using graphical modeling.

Software applications can be modeled using standardized specification languages such as Unified Modeling Language (UML), which is a visual specification language. The models, such as the class diagrams, created with UML are then derived to actual programming code. UML is often used for Object Oriented development but is more commonly adopted by the industry for high level software design in general, whether these design elements are further transformed into UML artifacts that will target artifacts of a programming language, which is commonly Object Oriented. The benefits of using UML during the design phases and describing software artifacts include the ability to conduct design review with a commonly accepted, high design language. It allows capturing the critical information that describes the application without detailing it down to the implementation level, and applying Model Driven Architecture techniques that provide code generation. Being able to represent artifacts that target procedural language, such as COBOL, enlarges the scope of assets that can be designed with UML in an enterprise. However, there is not a direct, obvious usage of UML representations in order to represent procedural artifacts, such as described in COBOL language.

Traditional methodologies that are dedicated to traditional programming describe the execution flow of a program. Some diagrams in UML 2.0 provide also a similar function. Adopting such diagrams in UML 2.0 is thus key for legacy modeling. Existing literature describes some techniques to use these UML diagrams for COBOL programs but they are generally limited to documenting behavior.

Thus, there is a need for a designer tool that would extend the current UML representations and support for representing control flow of COBOL programs including operations for data manipulation.

BRIEF SUMMARY

In one embodiment, a class diagram can be created for an application. The application can use a modeling language. The application can be configured for creation of the class diagram. The class diagram can comprise classes and relationships. The application can also be configured for creating flow diagrams comprising actions, relationships, and definitions of model element types. The application can also be configured to create new model elements in the class diagram and flow diagrams. A program new model element type can be applied to relevant class operations in the class diagram and a resource new model element type to relevant data classes of the class diagram. A flow diagram can be created per program of the application. The flow diagrams can be applied as many new model element types as different types of actions exist in the flow diagrams. These actions can represent the operations on resources.

DETAILED DESCRIPTION

Figure 1:
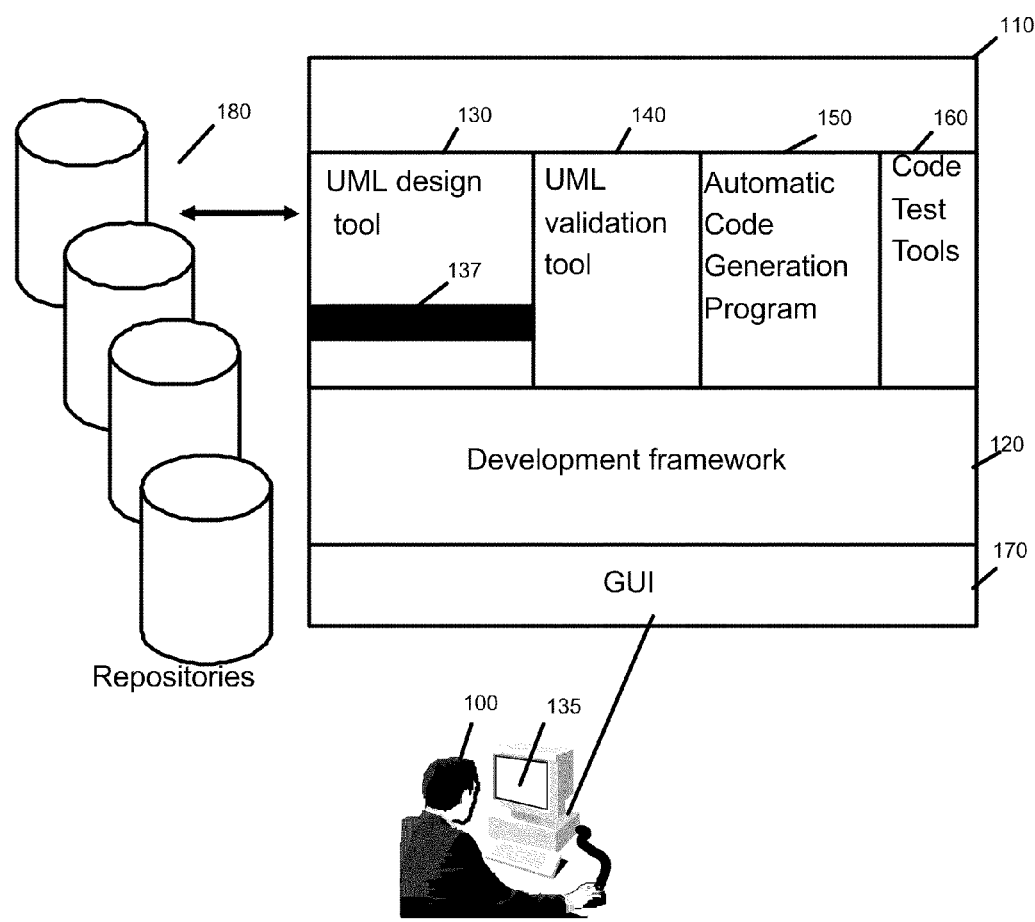
FIG. 1 is the system environment of a method of an embodiment of the present invention.

One aspect of the invention represents control flow information of a program which includes actions to manipulate data resources in a way allowing systematic code generation. Embodiments of the present invention include a method, system, and computer program product for creating a design model for programs in an application which represent the operations on resources performed by the program.

The new model can include a class diagram which is enhanced with two new stereotypes (in UML 2.0) for "Program" and "Resource" (a file, table, etc.). Each activity diagram corresponding to one program of the application is enriched with stereotypes for operations on the resources "open", "write", "read", "delete", "update". Furthermore, a "call" stereotype can be created for "call" to subprogram operations. The new model will be used for a complete view of the programs in the following steps of the development process. Furthermore, as a semantic is created the model can be automatically processed to create code in procedural language such as COBOL. It is noted also that the step of creating activity diagram can be automated using patterns as with International Business Machines Corporation (IBM) Rational Software Architect.

From the representation created according to an embodiment of the invention the developer will be able to automate code generation because he will be able to directly create a transformation tool which, when executed, takes the program representation and generates the code.

It is noted that even if the preferable modeling language is UML 2.0, any other design language is suitable as soon as it provides: (A) creation of class diagrams containing as model elements classes and relationships that the invention expands to adding the programs and the resources manipulated by the program, (B) creation of flow diagrams containing actions and relationships (so called activity diagram for UML 2.0) that embodiments of the invention expand for creating a control flow for a program, and (C) creation of model element types (so called stereotypes for UML 2.0) to apply in the class diagram and in the flow diagrams allowing their expansion.

Implementations of the present invention permit a developer to: (A) work with a UML class diagram and extend it through the use of stereotypes that identify a COBOL program and Resources such as Files, Database Tables, etc., (B) use an activity diagram to describe the control flow of the program and the actions that it is composed of, (C) provide Stereotypes for activity actions that describe the main resource manipulations and indicate the resources involved (i.e., the main action can involve: open, close, read, write, update, delete), (D) use the stereotyped Actions in the activity diagram to clearly identify the actions related to the resources and the resource involved, and (E) invoke the UML to COBOL transforms to automatically generate a COBOL program, its procedure division and the COBOL code to manipulate the resources.

One embodiment of the invention is a simple, non-ambiguous UML representation that is able to capture resource-related actions in the control flow of a program and the description of the associated resources. This description is based on a common vocabulary that makes review easy to perform since the semantics of such actions is well understood. It can be used by a dedicated transformation tool in order to generate the appropriate code to manipulate the resource, based on its type and definition.

The class diagram and activity actions used according to embodiments of the invention are necessary and sufficient to capture the manipulation made on the resources by the program and integrate with other specific business logic actions that are performed in the control flow of the program and that cannot be easily described in UML (e.g., an algorithm that expresses a business policy and involves various tests and calculations).

Various embodiments of the invention provide numerous benefits over prior art. In one embodiment, the disclosed solution is applicable to any program that is described through the operation of a UML class. Using an operation is a typical case for Service Oriented Architecture (SOA) and the mapping to a program is a natural extension for procedural languages. The logic of the resource operations remains the same whatever the target. Also, the stereotypes for the actions introduced can be mapped to the appropriate I/O operations of the resource (file, table, queue, etc.) A dedicated transformation for a particular language can be applied to use the correct language syntax and resource (such as a file) I/O API.

One embodiment of the disclosed solution can implement an extension to capture the usage of a subprogram by the program through a Call, and its associated properties using the same principles.

In one embodiment, numerous steps can be advantageously automated. For instance, patterns can be used which are compatible with IBM Rational Software Architect. The representation of common use cases can be automated for resource manipulations in a program.

FIG. 1 is the system environment of the method of the preferred embodiment. The developer 100 using procedural programming uses a development framework 120 on his computer for designing 130 programs by creating a model using for instance a UML design tool, validating them 140 using a validation tool, creating code 150 using when it is possible an automatic code generation and testing it 160 using a code test environment. Repositories 180 storing models, code elements, scripts etc. are accessed by these different functions of the framework. For modeling the application UML can be used. A UML class diagram 135 representing the classes and their relationships are displayed on the console of the developer. These classes will be used by the components of the application. With the method of the preferred embodiment, the developer can extend the class diagram and create an activity diagram for the operation of a class, which is supposed to represent a program. The parameters of the operation will capture the data resources manipulated by the program. This activity diagram will be an extension of the UML model for the other components of the application to be developed. The developer will capture the control flow of the program though the activity diagram. Some actions will capture the I/O operations made against the resources manipulated by the program. Other actions will capture calling a subprogram. Some other actions will capture business logic within the flow. The developer will be then able to validate the control flow of the program in the same way he validates the rest of the application component UML model. As with the other UML models it will be possible to automatically generate the implementation related to the I/O resources for a given environment using dedicated automatic code generators.

A new software layer 137 is added to the function allowing creation of I/O related actions in the activity diagram connected to UML description of the program and its data resources.

It is noted that it is possible to facilitate creation of activity diagram extension using design tools 130. For instance, the IBM Rational Software Architect (RSA) Version 6 and 7 patterns can automate the creation of the model by creating the activity diagram and their actions corresponding to a pattern provided as input, applying the stereotypes and adding the flow links (relationships).

Figure 2:
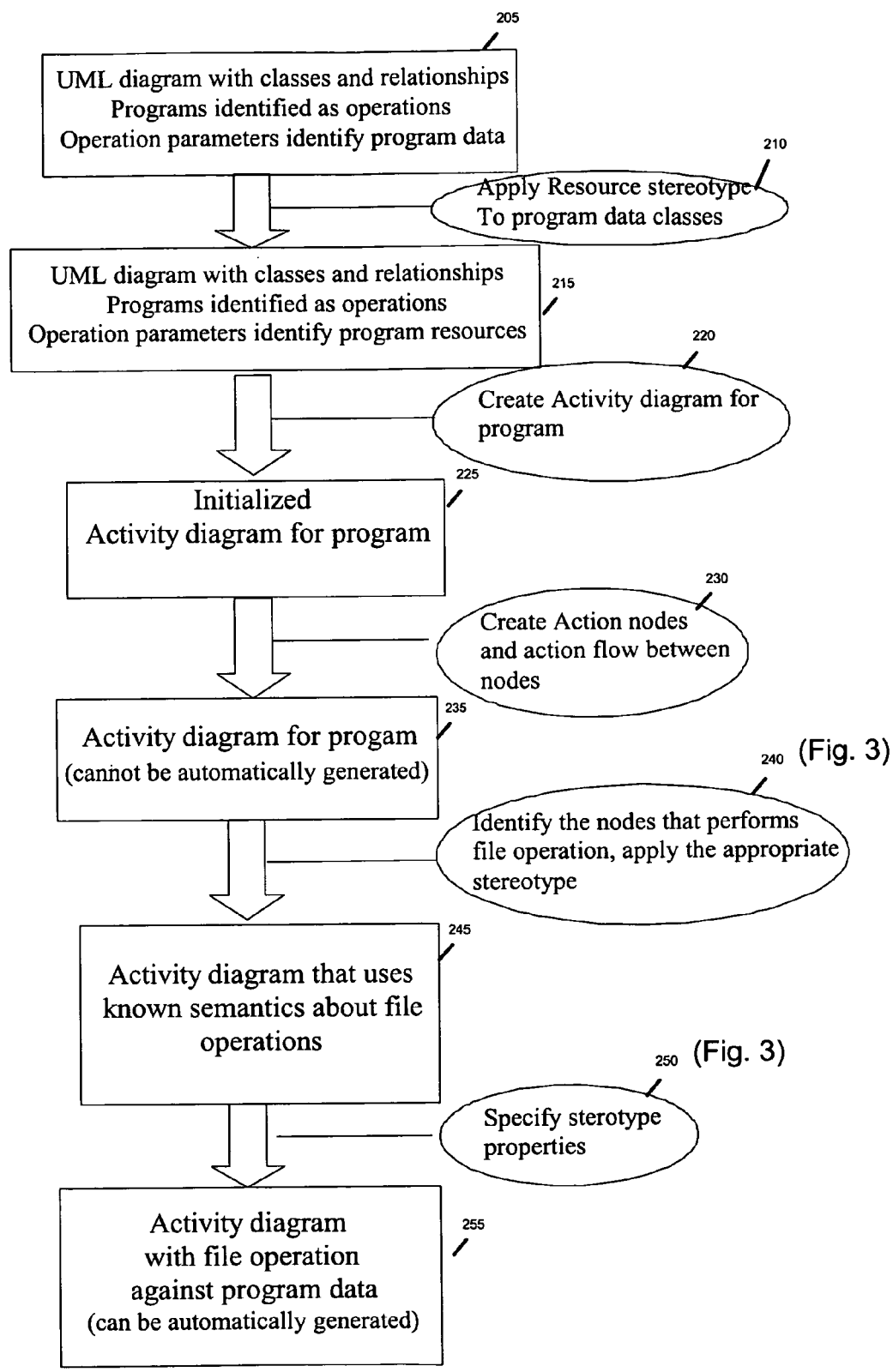
FIG. 2 illustrates the general steps of a method and data flow generated by the steps of the method according to an embodiment of the present invention.

FIG. 2 illustrates the general steps of the method and data flow generated by the steps of the method according to the preferred embodiment. The input data flow 205 is a UML class diagram which contains all the classes with attributes and operations and also relationships between these classes necessary to develop an application. This UML class diagram is obtained by the architects of the application after executing their design work through the existing graphical tools of the prior art for creating object models.

With UML 2.0, it is possible to define stereotypes and use them in a class diagram. This allows creating new model elements, derived from existing ones, but which have specific properties that are suitable for the problem domain, here the elements in relation with the control flow of a program. One new stereotype is the "Program" operation defining that an operation of a class is aimed at representing a program in COBOL.

With UML 2.0, it is also possible to define a flow diagram through the use of an activity diagram. It is also possible to associate an activity diagram to the operation of a class. When an operation represents a program, then it is possible to use the activity diagram to represent the control flow of the program.

As described in prior art, suggesting to have an operation of a UML class defining a COBOL program and its parameters as linkage data, it is desirable to use the parameters of an operation in order to define the data that the program is going to manipulate. However, identifying data for a program is not enough. There is a need to identify among these classes the data that is coming from resources.

With UML 2.0, it is possible to define stereotypes and use them in a class diagram. This allows creating new model elements, derived from existing ones, but which have specific properties that are suitable for the problem domain. Here, stereotypes are introduced that can apply to classes of a class diagram.

There is a need to identify, among the classes of the class diagram, the data that is coming from resources. In order to do that, a new stereotype "Resource" is introduced that can be applied to a Class. Such a stereotyped class is for describing Resources from a class and its dependencies, such resources being a file (sequential, indexed, etc.), a database table, a message queue, etc. Dedicated additional stereotypes allow specializing the resource, indicating its nature (file, database table, queue) and its specific characteristic (nature of the file, type of database used (hierarchical, relational), etc.)

The Resource stereotype is a generic stereotype to indicate that a class defines a Resource. Related to this stereotype, we also introduce File, Table, Queue stereotypes that will define the physical representation of the resource and its properties.

Thus the first stereotype "Program" will be applied to an operation of a class that represents a COBOL program. The second stereotype "Resource" will be applied to the classes used to type the parameters of the operation, in order to identify these classes as defining resources.

In step 210, an architect identifies among the classes of the UML class diagram the ones that contain operations that represent a program. The architect applies to these operations the stereotype "Program". This step may be performed in an UML 2.0 compliant visual editor. The architect also applies the Resource stereotype to the classes used as parameters of the operation and indicates the type of each resource. The architect then applies a second stereotype (one of File, Table or Queue) to indicate the actual type of the resource (File, Table, Queue) and its properties. A program and the resources it manipulates are now defined in UML.

Step 215 is the output of step 210. The UML class diagram now contains well identified Programs and the resources that they manipulate. These classes and operations are identified in the diagram through the use of the Resource and Program stereotypes.

Step 220 reflects the action of adding to the program a dedicated activity diagram. To do this, a UML 2.0 compliant tool is used and follows the regular UML process to associate an activity to a given operation and define an activity diagram to graphically represent the activity. This activity diagram will be used to represent the control flow (the actions, their sequence at a high level, with a graphical representation) of the program.

Step 225 is the activity diagram created in step 220 in UML. An activity is defined for a given program, but it is empty for now.

During step 230, the architect will create new actions nodes and action flow in the activity diagram created in step 220 in order to represent the control flow of the program. Each of the actions is a regular UML 2.0 action node and the architect chooses meaningful names to represent and document the operation that is being performed.

Step 235 is the result of step 230. The architect has built an activity diagram that is supposed to capture the control flow of the program. Names for the actions are based on the architect's own conventions and use the regular UML artifacts. This diagram can be used as documentation provided to the programmers, but requires the architect and the developers to agree and understand the conventions that the architect has used to describe the actions. This diagram cannot be automatically used to generate code as it is not based on a semantics known by the system, nor does it connect to the other UML artifacts described in the class diagram.

In step 240, the architect will now try to apply appropriate new stereotypes to the action nodes of the activity diagram, in order to identify the nodes that perform I/O operations against a resource manipulated by the program. In the preferred embodiment, the new stereotyped action nodes are the nodes which may represent either opening a resource ("open"—for example: open a file, the very first step before performing any action on it), closing a resource ("close"—for example: closing a file in order to save it; committing changes made to a relational table), reading one row in the resource ("read"), adding a row ("add"), updating the current read row of a resource ("update") or a deleting said row ("delete"). Also, a non I/O related action can be used, in order to specify that the program will actually call a subprogram ("call"). This action is extremely common in the procedural world and it is thus appropriate to capture it in the activity diagram.

Step 245 is the result of the actions performed during step 240. There now exists an activity diagram with well identified action nodes, some action nodes being stereotyped to represent which known I/O action is being performed.

Step 250 consists in entering the properties defined in the stereotype about the I/O actions: which resource is involved in the I/O action or which program is the target of the call.

Figure 3:
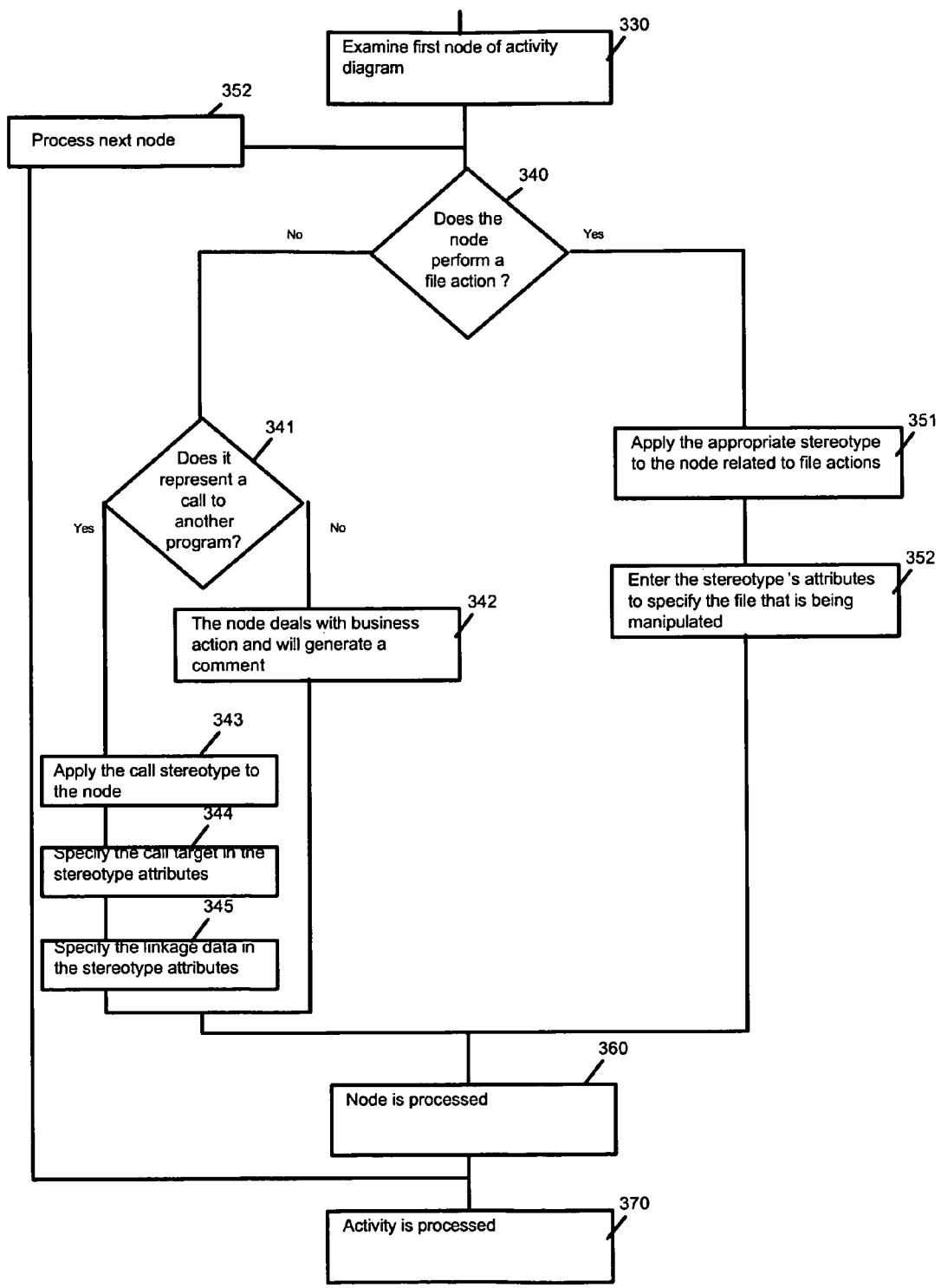
FIG. 3 is the detailed flowchart of the two of the general steps of FIG. 2 according to an embodiment of the present invention.

Step 240 and 250 are further detailed in reference to FIG. 3 diagram. This step of creation and aggregation of action nodes in an activity diagram is usually performed by an architect in an UML 2.0 compliant visual editor or can be performed with the help of the computer executing IBM Rational Software Architect (RSA) version 6 and 7 patterns as it will be detailed later in the document in reference to FIG. 5.

The UML activity diagram (255) which is the output of the actions performed during step 240, comprises well identified action nodes that represent the actions that one can perform against a resource. It also contains a property indicating the appropriate resource to use in each action node.

It is noted that in the same way, Call to other programs are also captured through the use of a dedicated "Call" stereotype. This "call" stereotype provides properties to capture the target of the call and the data that will be shared with the called subprogram.

The nodes that are not stereotyped are considered as performing business logic that will need to be further detailed by the programmer in the target language. This is well known that every operation in an application cannot be fully expressed in UML and the generated code needs to be enhanced by the programmer in order to translate the business rules into business logic in the target programming language (a mathematical formula for instance).

A simple description has now been obtained in UML of the control flow of a Resource oriented program. This description also captures the resource definition of the program in the class diagram. The Resources are themselves identified classes of the original UML system description. This diagram is thus fully consistent with the initial UML class diagram (205). It is thus an extension of the initial diagram. This UML model extension can be used for reviewing and validating the design of the program and its control flow. It can be transformed into COBOL code for a given target (CICS, IMS, batch, etc.) and then enhanced by programmers to capture the business logic itself.

FIG. 3 is the detailed flowchart of the 240 and 250 general steps of FIG. 2 according to the preferred embodiment. As will explained further in FIG. 3, the steps 340, 341, 343 and 351 leads to execution of step 240 and steps 344, 345 and 352 lead to step 250 execution. The input of these steps is a UML model that contains a class diagram, an operation of a class having been identified as a program. Some of the classes that correspond the types of the parameters of the operation have been stereotyped as resource. An activity diagram is already associated to this operation. The activity diagram already describes, through UML action nodes and decisions nodes, the control flow of the program that the program is supposed to perform.

The architect is going to iterate over the nodes in order to see if the action relates to a resource. If so, he will apply the appropriate stereotype to the node (one of "open", "close", "read", "add", "update", "delete") and specify the resource properties. He will also represent Call to subprograms using the "call" stereotype.

In step 330, the architect examines an action node of the activity diagram. He will consider whether the action relates to one of the resources of the program (such a file) or not (step 340). If it does (answer yes to step 340), then he will apply the appropriate stereotype (step 351) and will indicate in the properties of the stereotyped node the resource it applies to (step 352). If the action does not relate to one of the resources of the program (answer no to step 340), there is still one thing to consider: does the action involve a call to a subprogram (step 341). If it does (answer yes to step 341), then the architect will apply (343) the Call stereotype, indicate in the properties of the stereotyped node the target of the call (i.e., the subprogram that is invoked) (344) and also the data sent to the subprogram through its linkage section (345). If the action node is not a Call (answer no to step 341) it is thus known that it is not a resource action. Then, the action node is supposed to represent specific business logic that the programmer will implement (342) in the target language.

Now that one node is processed (step 360), the architect can iterate and process the following node (step 352). The architect will thus iterate and process all the nodes of the activity diagram. With step 370, all the nodes have been processed and the activity diagram is now fully updated, the stereotypes applied where necessary and the appropriate properties are set.

Figure 4:
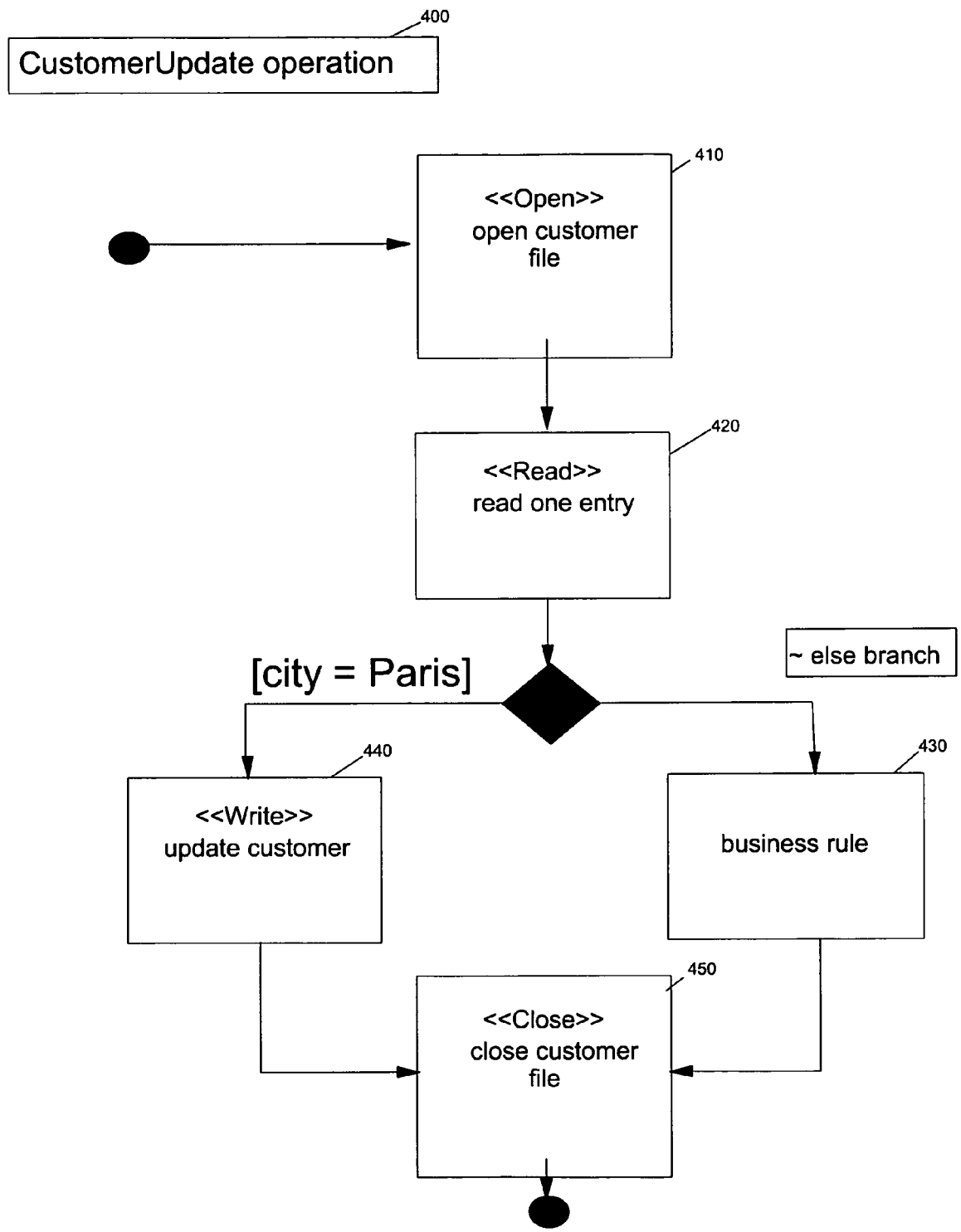
FIG. 4 is an example of an activity diagram of a program obtained according a method of an embodiment of the present invention.

FIG. 4 is an example of an activity diagram of a program obtained according the method of the referred embodiment. This is the activity diagram obtained after execution of steps 240 and 250. This activity diagram describes a customer update operation so called 'CustomerUpdate'. It uses the stereotypes newly defined for a program which deals with customer resources (e.g., a file or a table of customer rows). The program will first open 410 the customer resource, read 420 a row, based on a decision for which test involves the condition "City equals Paris", either update the customer 440 or perform business logic. At the end, the resource is closed 450.

The benefit is shown from the representation of an activity diagram, which in this case represents the Control Flow of a program. It is very easy to read; it is extended to support a known semantics for the actions that makes the diagram easier to validate by the designer in the development process of the application since it is based on a common vocabulary. It is also possible to use the diagram as an input of a transformation to create the implementation pieces corresponding to the stereotyped nodes, according to the flow of the program. Said transformation will be used for automatic generation of the code (for instance COBOL code).

The activity diagram can be created using a UML V2 editor such as IBM Rational Software Architect version 6 or 7. Tools, such as IBM Rational Software Architect in version 6 and 7, propose the concept of patterns that allows automating the creation or update of models. Patterns are instantiated by the architect with a set of input parameters. The tool performs some processing based on these inputs that can, for example, create new classes, apply stereotypes, create relationships, etc.

Figure 5:
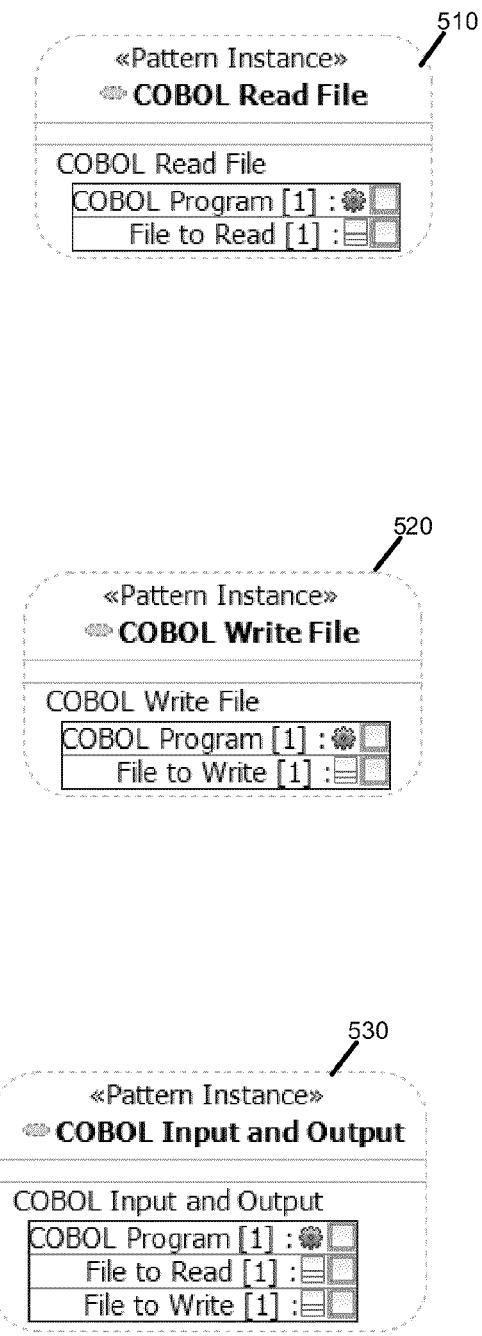
FIG. 5 illustrates patterns which can be used for automating some steps of a method of an embodiment of the present invention.

FIG. 5 describes patterns which can be used for automating some steps of the method of the preferred embodiment. Such UML 2.0 editors as IBM Rational Software Architect in version 6 and 7 can be used to automate steps 220, 230, 240 and 250 for populating the extended UML activity diagram with the components corresponding to the description of program manipulating resources.

The manipulation of resources respects a given order: for instance, a file needs to be opened before closing it. This is found in the typical use-cases for manipulating the resource. For instance, using a file to read each of its rows. Note that these use-cases apply whatever the actual type of resource (file, relational table, etc.). For instance, a file will be opened, actions will be performed, then it will be closed. For a table, a connection will be created, the actions will be performed and the operations will be committed. As already described in reference to the description of the preceding figures, with the solution of the preferred embodiment, an architect is able to describe such steps in a way that allows code-generation, because of the new stereotypes created for a program that bring new semantics to the activity diagrams. As illustrated in FIG. 5, it is possible to go one step further in the automation of the developer tasks by automating the creation of an activity diagram including Resource manipulation for a given use case. Thus it is possible to help the developer to initialize the program activity diagram by providing patterns that describe common use-cases for manipulating resources. The patterns require very few parameters: the program that the activity diagram is attached to, and the files involved in a given use case. A user would typically select the pattern that captures the use-case he is interested in, populate the pattern parameters: first with the program (a UML operation with the Program stereotyped applied); then with the resources (a Class with the Resource stereotype applied). The pattern would then automatically create the relevant UML 2.0 artifacts. In our case, all the action nodes, connections with the appropriate stereotype applied and their properties set in an activity diagram.

"Read File" Pattern (510): This pattern has 2 parameters: the program and the file to read. It creates an activity diagram that is linked to the operation (the operation represents the program), creates the nodes and the relationships in order to describe a control flow where a file is opened, looped, read and closed. It applies the appropriate stereotypes and sets the properties to indicate the resource involved on each node. Such a diagram can be used as-is or can be enhanced in order to capture specifics of the flow, additional file related operations or business logic nodes.

"Write File" pattern (520): This pattern has 2 parameters: the program and the file to write. It creates an activity diagram that is linked to the operation (the operation represents the program), creates the nodes and the relationships in order to describe a control flow where you open, loop, read a row, update the row or delete it based on a condition and then close a file. It applies the appropriate stereotypes and sets the properties to indicate the resource involved on each node. Such a diagram can be used as-is or can be enhanced in order to capture specifics of the flow, additional file related operations or business logic nodes.

"Input and Output Files" pattern (530): This pattern has 3 parameters: the program, the file to read, the file to write. It creates an activity diagram that is linked to the operation (the operation represents the program), creates the nodes and the relationships in order to describe a control flow where you open 2 files, loop, read a row of one file, create a row in the other file and then close the files. It applies the appropriate stereotypes and sets the properties to indicate the resource involved on each node. Such a diagram can be used as-is or can be enhanced in order to capture specifics of the flow, additional file related operations or business logic nodes.

More patterns could be introduced to capture other combinations of file manipulations. The principle of these other patterns however remains similar in concept: the application of the pattern would create the activity that represent the control flow of the program; the necessary nodes, connections; set the properties regarding the resource(s) to manipulate; apply the appropriate stereotypes. The resulting activity diagram would represent the control flow of a program for the use-case of resource(s) manipulations that the pattern captures.

The invention claimed is:

1. A method for modeling programs comprising:
creating a class diagram for an application, wherein the application uses a modeling language, said application being configured for creation of the class diagram comprising classes and relationships, flow diagrams comprising actions, relationships, and definitions of model element types, wherein said application is configured to create new model elements in the class diagram and flow diagrams;
applying a program new model element type to relevant class operations in the class diagram and a resource new model element type to relevant data classes of the class diagram, wherein applying new model element types to the flow diagrams comprises defining properties for each new model element, said properties comprising at least a resource name property;
creating a flow diagram per program of the application; and
applying to the flow diagrams as many new model element types as different types of actions exist in the flow diagrams, these actions representing the operations on resources.

2. The method of claim 1, wherein applying new model element types to the flow diagrams include applying open, read, write, close, delete, and update, each representing operations on resources.

3. The method of claim 1, wherein applying new model element types to the flow diagrams include applying call representing operations on resources which call subprograms.

4. The method of claim 1 further comprising:
creating a transformation tool to generate code in a procedural programming language from the class diagram and the flow diagrams on which the new model element types have been applied.

5. The method of claim 1, wherein creating the class diagram, applying the program new model element type, and applying the flow diagrams are performed using a graphical modeling language.

6. The method of claim 1, wherein creating the class diagram, applying the program new model element type, and applying the flow diagrams are performed using UML 2.0 modeling language, wherein the model element types comprise stereotypes, and wherein flow diagrams comprise activity diagrams.

7. The method of claim 4, wherein creating the transformation tool step comprises the transformation tool generating COBOL code from the class diagram and the activity diagrams on which the new model element types have been applied.

8. The method of claim 1, wherein applying the program new model element type, and applying the flow diagrams are automatically performed by a computer, said method further comprising:
providing as input patterns describing typical use cases on the model elements.

9. A computer program product stored on a non-transitory computer usable medium comprising computer readable program which when executed on a computer cause said computer to:
create a class diagram for an application, wherein the application uses a modeling language, said application being configured for creation of the class diagram comprising classes and relationships, flow diagrams comprising actions, relationships, and definitions of model element types, wherein said application is configured to create new model elements in the class diagram and flow diagrams;
apply a program new model element type to relevant class operations in the class diagram and a resource new model element type to relevant data classes of the class diagram, wherein applying new model element types to the flow diagrams comprises defining properties for each new model element, said properties comprising at least a resource name property;
create a flow diagram per program of the application; and
apply to the flow diagrams as many new model element types as different types of actions exist in the flow diagrams, these actions representing the operations on resources.

10. The computer program product of claim 9, which when executed on a computer cause said computer to:
create a transformation tool to generate code in a procedural programming language from the class diagram and the flow diagrams on which the new model element types have been applied.

11. The computer program product of claim 10, wherein the creating of the transformation tool generates COBOL code from the class diagram and the activity diagrams on which the new model element types have been applied.

12. The computer program product of claim 9, wherein creating the class diagram, applying the program new model element type, and applying the flow diagrams are performed using UML 2.0 modeling language, wherein the model element types comprise stereotypes, and wherein flow diagrams comprise activity diagrams.

13. The computer program product of claim 9, wherein applying the program new model element type, and applying the flow diagrams are automatically performed by a computer executing IBM Rational Software Architect, wherein executing the computer program product further causes said computer to:
provide as input patterns describing typical use cases on the model elements.

14. A system for modeling programs comprising:
a computer executing at least one computer readable program stored on a non-transitory computer usable medium configured to:
create a class diagram for an application, wherein the application uses a modeling language, said application being configured for creation of the class diagram comprising classes and relationships, flow diagrams comprising actions, relationships, and definitions of model element types, wherein said application is configured to create new model elements in the class diagram and flow diagrams;
apply a program new model element type to relevant class operations in the class diagram and a resource new model element type to relevant data classes of the class diagram, wherein applying new model element types to the flow diagrams comprises defining properties for each new model element, said properties comprising at least a resource name property;

create a flow diagram per program of the application; and
apply to the flow diagrams as many new model element types as different types of actions exist in the flow diagrams, these actions representing the operations on resources.

15. The system of claim 14, further configured to:
create a transformation tool to generate code in a procedural programming language from the class diagram and the flow diagrams on which the new model element types have been applied.

16. The system of claim 15, wherein the creating of the transformation tool generates COBOL code from the class diagram and the activity diagrams on which the new model element types have been applied.

17. The system of claim 14, wherein creating the class diagram, applying the program new model element type, and applying the flow diagrams are performed using UML 2.0 modeling language, wherein the model element types comprise stereotypes, and wherein flow diagrams comprise activity diagrams.

18. The system of claim 14, wherein applying the program new model element type, and applying the flow diagrams are automatically performed by a computer, wherein said system is further configured to:
provide as input patterns describing typical use cases on the model elements.

* * * * *